June 25, 1935.  J. D. BENBOW ET AL  2,005,727
CONTROLLING MECHANISM FOR VEHICLE DUMP DOORS
Original Filed Nov. 10, 1930  5 Sheets-Sheet 1
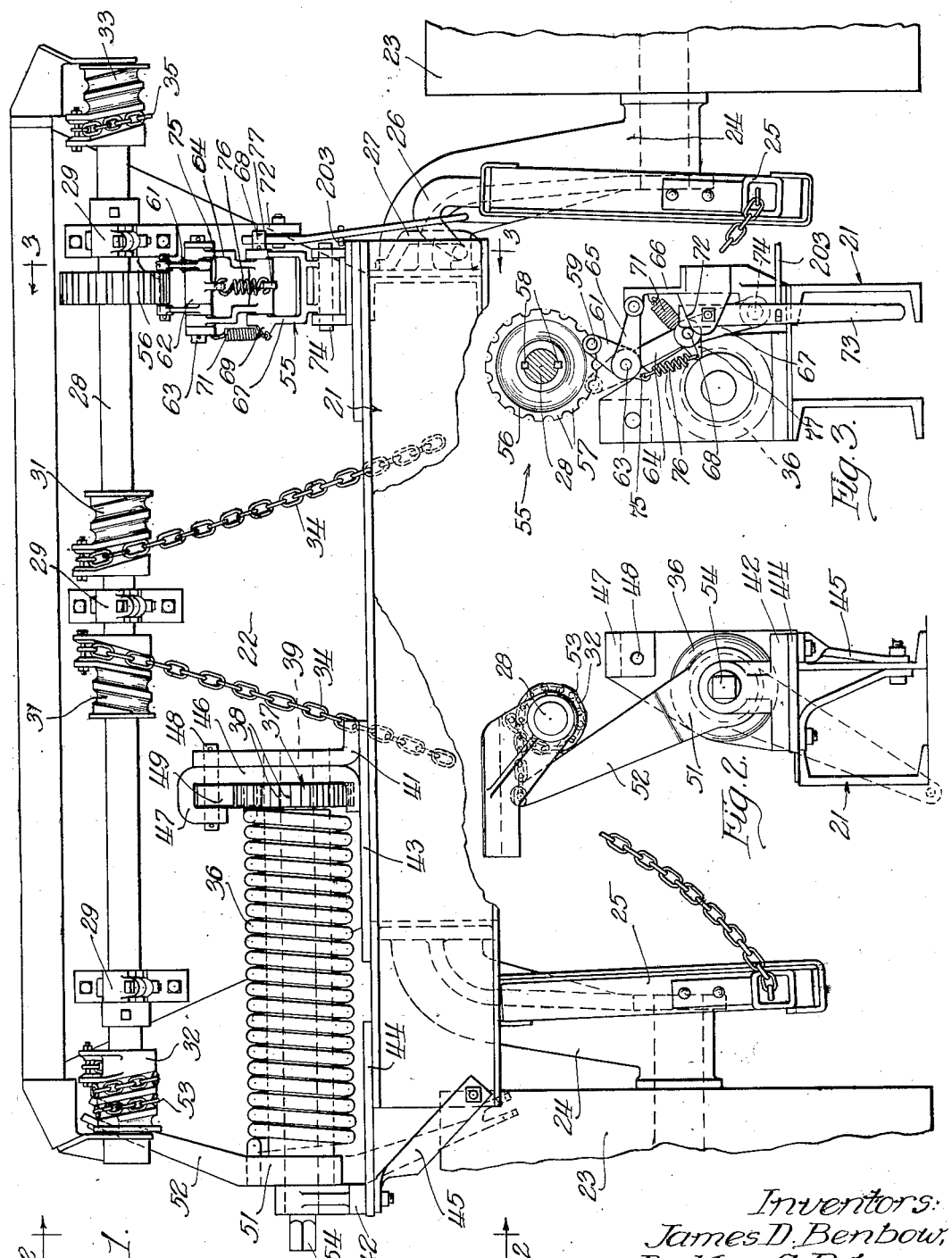
Inventors:
James D. Benbow,
DeMar A. Palmer.
By Brown, Jackson, Boettcher & Dienner
Attys.

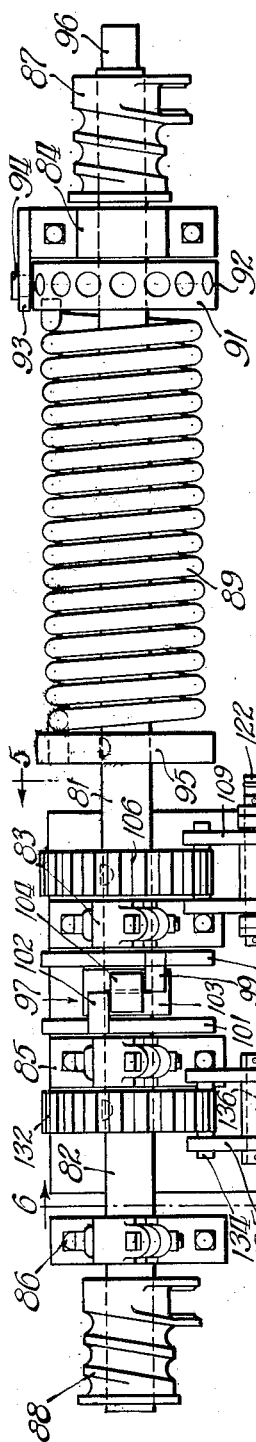

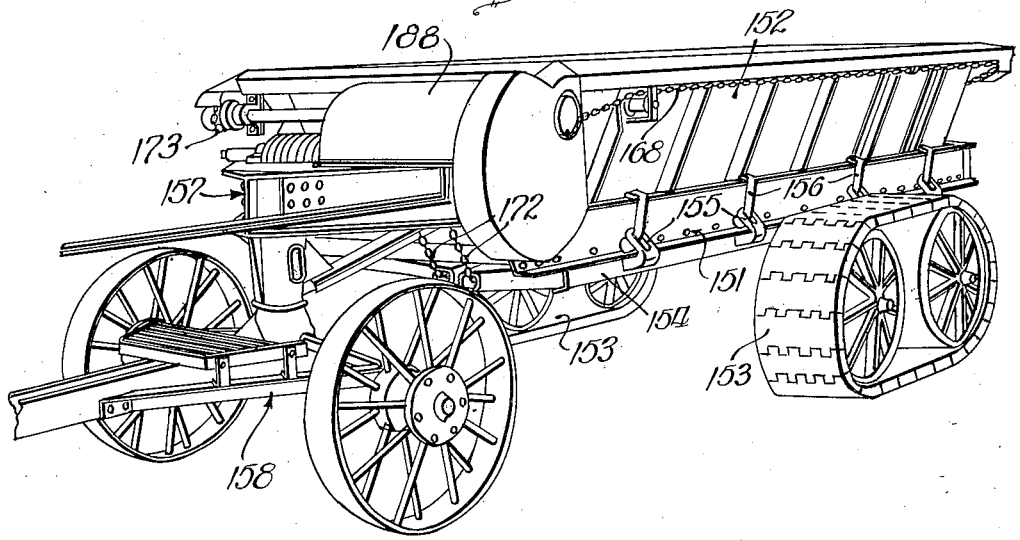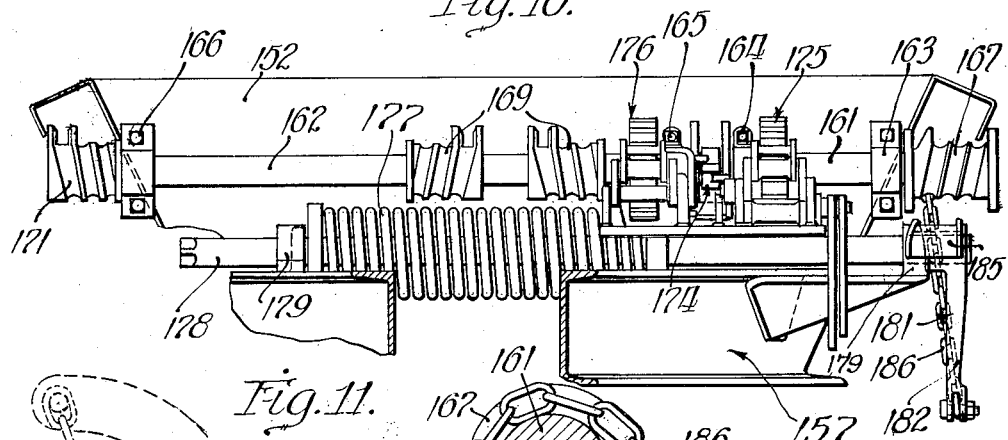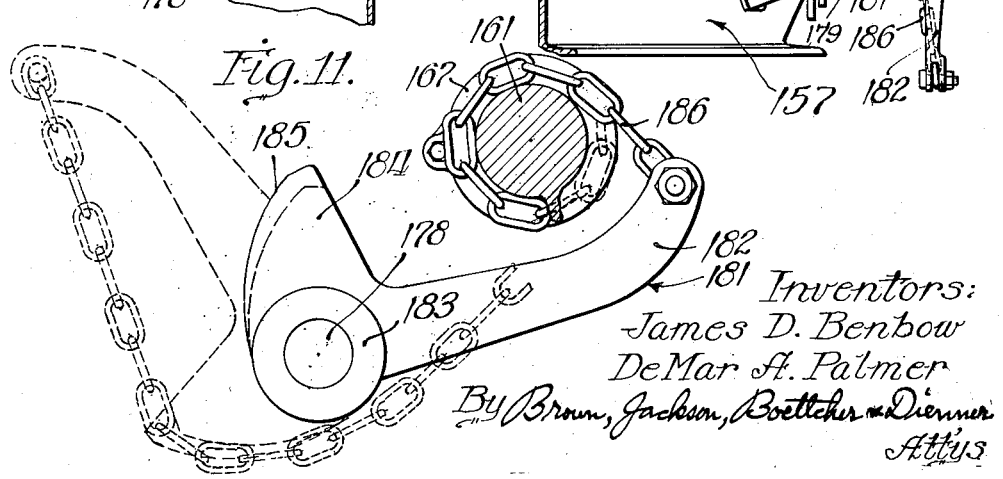

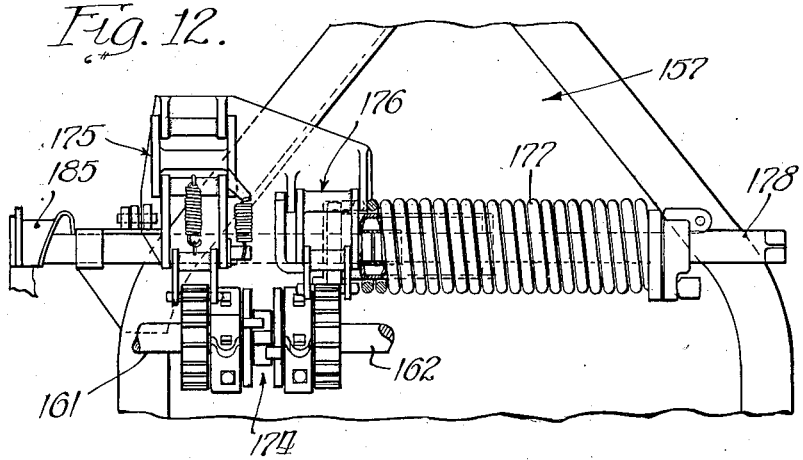
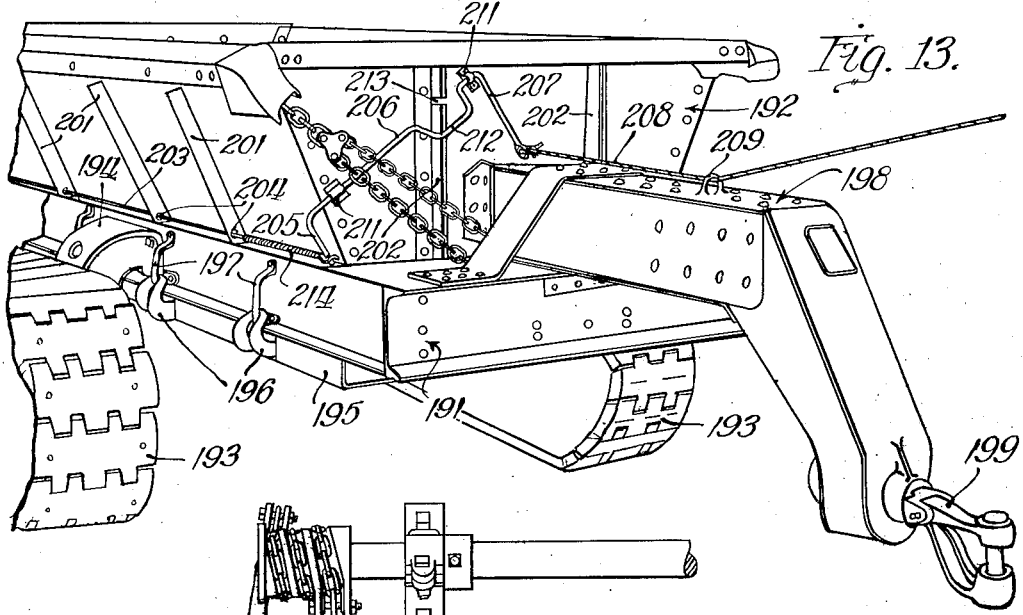
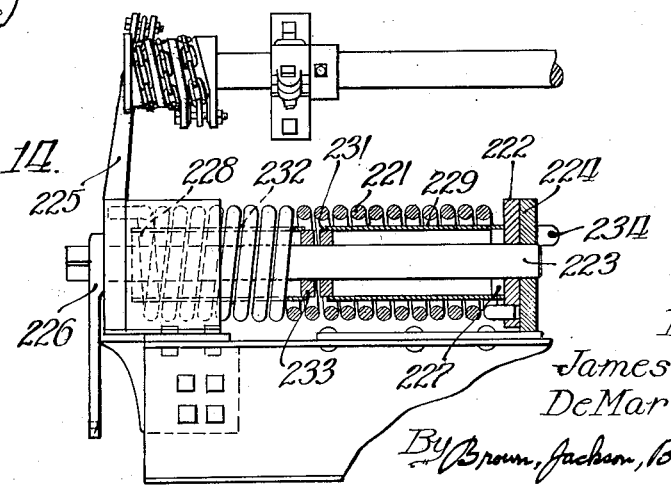

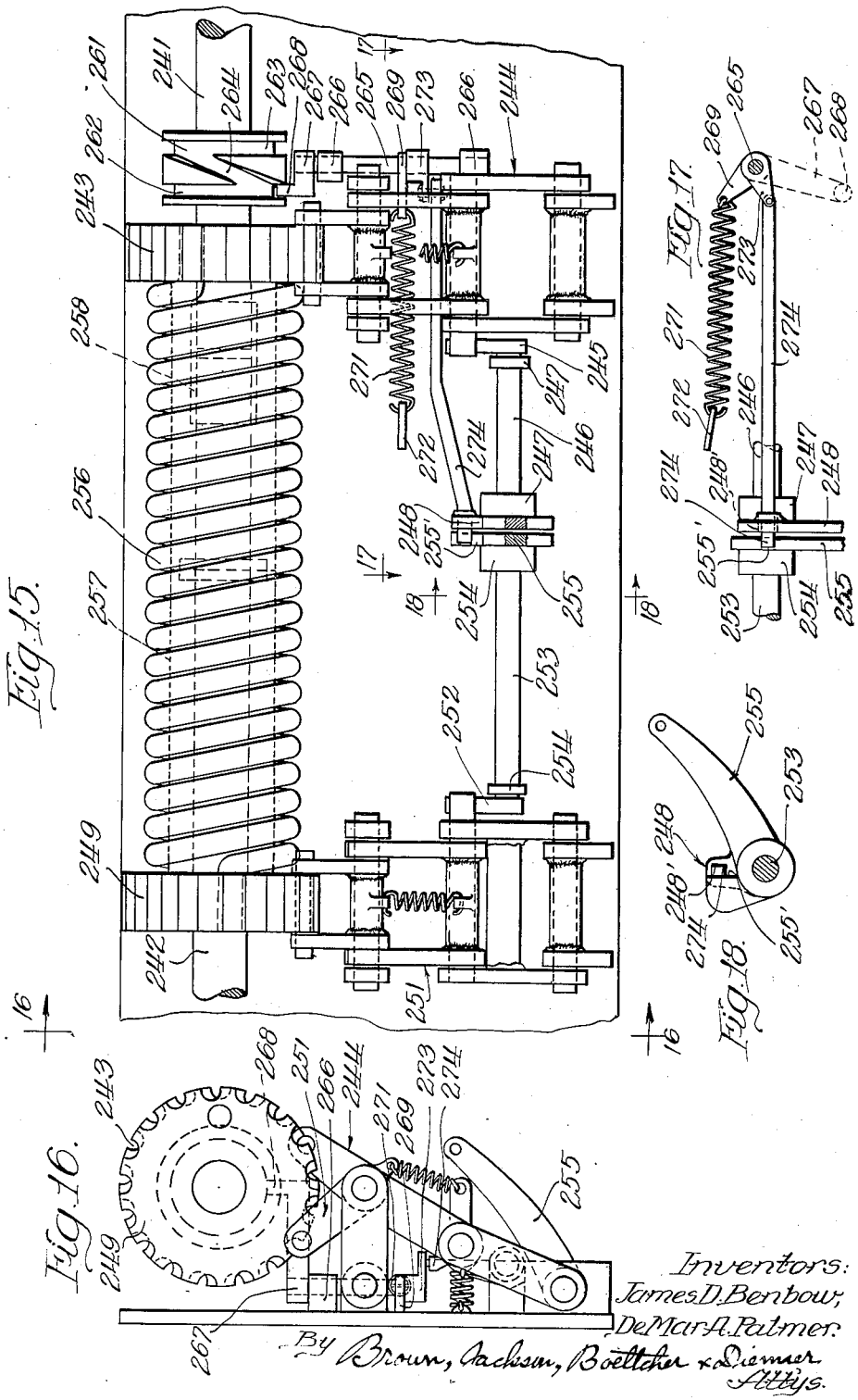

Patented June 25, 1935

2,005,727

UNITED STATES PATENT OFFICE 2,005,727

CONTROLLING MECHANISM FOR VEHICLE DUMP DOORS

James D. Benbow and De Mar A. Palmer, Aurora, Ill., assignors, by mesne assignments, to Western-Austin Company, Aurora, Ill., a corporation of Illinois Application November 10, 1930, Serial No. 494,562
Renewed November 17, 1933

35 Claims. (Cl. 298—35)

The present invention relates to improvements in operating and controlling mechanisms for dumping doors of load carrying vehicles. More particularly, the present invention pertains to such improved operating and controlling mechanisms adaptable to load carrying vehicles of the general class wherein, when the door or doors are tripped or released for dumping the weight of the load, such weight acts to assist in forcing the door or doors to dumped position and is utilized to store energy in a spring, which energy is employed for returning the door or doors to normal closed position. More specifically, the present invention may be characterized as an improvement in operating and controlling mechanisms of the type disclosed in the co-pending application of De Mar A. Palmer, for Controlling mechanism for vehicle dump doors, Serial No. 494,551, filed November 10, 1930. The broad claims covering features of the operating and controlling mechanisms of the present application which are in common with features of the operating and controlling mechanisms of the co-pending application, Serial No. 494,551, are contained in said co-pending application.

While the present invention has been particularly devised for load carrying wagons, carts and trailers having bottom dumping doors, it also has applicability to railway dump cars and to dumping containers generally wherein a dumping door or closure is adapted to be returned to closed position by spring energy.

One of the principal features of the invention resides in the provision of improved motion transmitting mechanism for operatively connecting the spring return means with the dumping door or doors.

In this regard, one of the objects of the invention is to provide improved motion transmitting mechanism by which the range of deflection to which the return spring is subjected during the movement of the doors can be reduced to a desirably smaller degree. In the preferred construction of dump wagon, the dump doors are pulled back to their closed positions, and held in such positions, by chains, cables or like flexible members, which have operative connection with the doors. These chains or cables are adapted to wind upon and unwind from drums or spirally grooved sheaves mounted on a winding shaft. In the dumping movement of the doors, this winding shaft is compelled to rotate through a motion ranging from one to three or more complete revolutions, depending upon the proportions of the parts. The return spring is preferably a helically coiled torsion spring which is caused to wind and unwind with the rotation of said shaft. Difficulties are sometimes encountered when the construction is such that this torsion spring must be deflected or torsioned through the same range of angular movement as said shaft. This is particularly true when space limitations on the wagon preclude the use of a relatively long spring, it being evident that the shorter the spring the smaller the range of angular movement which can be transmitted to that spring without large increases of torsional stress in the spring. It is undesirable to have the torsion pressure of the spring rise too suddenly as the dumping doors approach their fully dumped positions, because as the doors approach these positions the partial dumping of the load and the angular positions of the doors combine to diminish the effective force which the doors can exert for winding the spring, and if the spring has too sudden a rise in torsion pressure it may interfere with complete opening of the doors. The present motion transmitting mechanism herein disclosed avoids this objection by providing for a relatively small range of deflection of the spring while the doors are moving between their closed and open positions.

A further object of the invention in regard to this motion transmitting mechanism is to provide an improved mechanism characterized by a variable ratio of mechanical advantage for securing improved operation of the doors and of the return spring. In the preferred construction, this variable ratio of mechanical advantage is so arranged that as the doors are approaching their open position in the dumping operation they are transmitting winding rotation to the spring through an increase in mechanical advantage or increase in length of effective lever arm; whereby, notwithstanding the partial dumping of the load and the less favorable angle of the doors to transmit energy to the spring, they nevertheless are enabled to open to their fully dumped positions. This variable ratio of mechanical advantage also cooperates in assuring complete closing of the doors in the closing operation.

Another object of the invention is to provide an improved arrangement and more compact assembly of the operating parts, better suited to the space limitations of the dump wagon. In the preferred construction incorporating this feature of the invention, the spring means is mounted separately from the winding shaft which carries the winding drums, and the shaft is operatively connected with the spring means through motion transmitting mechanism. Such construction and arrangement enables a greater length of spring to be employed without increasing the length of the assembly which includes the winding shaft, winding drums, ratchet means etc., and in fact enables such assembly to be made shorter.

Another object of the invention is to provide improved means for controlling the dumping of the doors in a wagon having front and rear compartments adapted to be closed by front and rear pairs of doors. An exemplary type of a two-compartment vehicle is illustrated in the Benbow and Green Patent No. 1,706,099, granted March 19, 1929, to which reference may be had for a more detailed disclosure. In the preferred construction of this type of vehicle, the major portion of the load is carried on an axle which is disposed approximately midway between the ends of the vehicle bed, a considerable part of the load being balanced about this axle. When applying our improved spring wind-up mechanism to this type of vehicle, we associate with said spring wind-up mechanism an improved interlocking mechanism arranged whereby the rear pair of doors can be dumped independently of the front pair of doors, but the front pair of doors cannot be dumped prior to or independently of the rear pair of doors. This arrangement prevents the possibility of a load condition arising which might tilt the wagon backwardly around the axis of the aforesaid main supporting axle, which condition might arise in the case of a heavily loaded vehicle, should the front compartment load be dumped first so that the weight of the load in the rear compartment would tend to tip the wagon backwardly. The rear compartment doors can be dumped independently of the front compartment doors at any time, but to insure that the front compartment doors cannot be dumped prior to the rear compartment doors the improved interlocking mechanism associated with the spring wind-up mechanism compels both pairs of doors to dump simultaneously when the first pair of doors is dumped.

Other objects and advantages of the invention will appear in the following detail description of certain preferred embodiments thereof. In the accompanying drawings illustrating such embodiments:

Figure 1 is a fragmentary rear elevational view of a wagon incorporating one embodiment of the present invention, showing the dump doors in their dumped or open positions;

Figure 2 is a detail side elevational view, taken approximately on the plane of the line 2—2 of Figure 1, and illustrating one embodiment of motion transmitting mechanism cooperatively connecting the winding shaft with the return spring;

Figure 3 is a detail sectional view taken approximately on the plane of the line 3—3 of Figure 1 and illustrating one embodiment of the ratchet control mechanism for controlling the opening and closing movements of the doors.

Figure 4 is a front elevation of another preferred embodiment of the present invention illustrating a novel control mechanism for four door vehicles embodying novel features precluding the dumping of a front compartment load prior to the dumping of a rear compartment load;

Figure 5 is a sectional elevation of the rear compartment door control ratchet mechanism, taken substantially along the line 5—5 of Figure 4;

Figure 6 is a side elevation of the ratchet mechanism for controlling the front door operating shaft substantially as viewed along the line 6—6 of Figure 4;

Figure 7 is an enlarged fragmentary view of the clutching or interlocking mechanism employed in the modification disclosed in Figure 4;

Figure 8 is an end view of the clutching mechanism taken substantially along the line 8—8 of Figure 7;

Figure 9 is a perspective view of a four door dump vehicle showing the position thereon of another embodiment of the present invention and further illustrating an encasing cover for all of the control and spring return connections;

Figure 10 is a fragmentary front elevation of the operating and control mechanisms shown in Figure 9 and including a modified form of motion transmitting mechanism connected between the spring mechanism and the operating shaft of the rear pair of doors;

Figure 11 is an enlarged end view illustrating, in greater detail, the construction and connection of the novel motion transmitting mechanism employed with the embodiment disclosed in Figure 10;

Figure 12 is a plan view of the mechanism disclosed in Figure 10 as viewed looking downwardly on the forward portion of the vehicle;

Figure 13 is a fragmentary perspective of a dump vehicle of the type having a forwardly extending draw beam adapted for connection with a tractor or the like, showing operating connections for tripping the ratchet mechanism of a door operating and controlling mechanism mounted at the rear end of the vehicle bed;

Figure 14 is an enlarged fragmentary view of an independently mounted spring return means as situated for association with an operating and control mechanism such as is disclosed in Figures 1 to 3, inclusive, and illustrating improved means for preventing buckling of the spring and for locking the spring at different initial tensions;

Figure 15 is a fragmentary elevation of another embodiment of the present invention showing an operating and control mechanism for four door vehicles, wherein dumping of the load of the front compartment prior to dumping of the load of the rear compartment is precluded;

Figure 16 is an end elevation of the mechanism as viewed substantially along the line 16—16 of Figure 15;

Figure 17 is a detail sectional view taken approximately on the plane of the line 17—17 of Figure 15; and Figure 18 is a detail sectional view taken approximately on the plane of the line 18—18 of Figure 15.

The general construction of the load carrying vehicle body or bed is not of the essence of the present invention and may be of any preferred or desired type. In Figure 1, we have illustrated, by way of example, a dump wagon or cart comprising a frame 21, a load carrying bed or hopper 22 carried or supported thereon, and a pair of endless track laying or creeper tread units 23 on which the frame and bed are supported through arched axle brackets 24 extending downwardly and outwardly on opposite sides of the frame and preferably intermediate the ends thereof. The open bottom of the bed 22 is normally closed by dump doors 25, 25 which may have any suitable hinged or pivotal connection with the bed or frame, such, for example, as by hinge eyes 26 secured to the outer edges of the doors and having swinging and vertically sliding engagement with suitable hinge brackets or bars 27 secured in spaced relation longitudinally of the side members of the main frame 21. This exemplary type of dumping vehicle is illustrated in the Benbow and Green Patent No. 1,706,099, granted March 19, 1929, to which reference may be had for a more detailed disclosure.

The improved mechanism disclosed in Figures 1, 2 and 3 for controlling or operating the dumping doors 25 comprises a transverse shaft 28 disposed at one end of the vehicle bed 22, preferably at the rear end, and rotatably journaled in spaced bearing brackets 29 suitably secured to such end of the bed. Although it is preferred to mount this shaft 28 upon the end of the bed of the vehicle, it will be readily understood that the shaft may be mounted in a similar manner upon the end member of the main frame 21. Mounted on the central portion of this shaft 28 are two spirally grooved winding drums or sheaves 31—31, and two similar winding drums or sheaves 32 and 33 are suitably secured at the outer ends of the shaft. Winding upon the two intermediate drums 31 are chains or cables 34 which, as shown in Figure 1, extend down to approximately the meeting edges of the doors 25, from which they extend lengthwise of the doors forwardly thereof, either through channels or tubular guides formed at the meeting edges of the doors, or under the doors in suitable guides therefor. The forward ends of the flexible members 34 are then connected to an equalizing member (not shown) which is, in turn, connected to a chain or cable 35 passing over a suitable guide sheave preferably disposed at one of the upper forward corners of the vehicle bed, thence extending along the outer side and adjacent the top edge of the bed back to the winding drum 33 at the outer end of the shaft 28. When the vehicle is provided with separate front and rear pairs of dumping doors, a second winding drum may be provided at the other outer end of the shaft 28 adjacent to the drum 32 and from this drum, suitable cable or chain connections may extend forwardly of the vehicle bed to the front pair of doors.

It will be readily apparent from the foregoing, that rotation of the shaft 28 in unwinding direction of the cables or chains 34 is operative to lower the doors to dumping position, and rotation of such shaft in the opposite direction is operative to raise the doors to closed position.

Mounted preferably to one side of the rear end of the vehicle bed 22, to the left as viewed in Figure 1, and on the end member of the main frame 21, is a rather heavy helical coiled spring 36 in which energy is stored by the tensioning thereof in the dumping operation or rotation of the shaft 28, such energy being then employed after the completion of the dumping operation for returning the doors to closed position. The inner end of the spring 36 has anchored connection to a disc or collar 37 having peripheral one-way ratchet teeth 38, said collar being suitably fixedly connected to a shaft 39, which shaft is suitably journaled in spaced aligned brackets 41 and 42, the former constituting the inner end bearing support and the latter the outer end bearing support. These brackets are suitably secured to the upper side of the end member of the main frame 21, bracket 41 being suitably bolted, riveted, or welded to a plate 43, in turn suitably secured to the upper side of the end member of the main frame 21; and bracket 42 being suitably supported upon the end member of the main frame 21 by being bolted to a platform plate 44, in turn suitably secured to the outer end of the end member of main frame 21 and having a portion thereof extending over and beyond the outer end of such end member. A brace member 45 is suitably bolted to the under side of the plate 44 adjacent its outer end, the lower end of brace member 45 being in turn suitably bolted to the web portion of the end member of main frame 21. Disposed between bracket 41 and collar 37 and suitably secured to the plate 43, is a second vertically extending bracket 46, the upper end of which is reversely bent to provide a substantially U-shaped supporting portion 47, through the outer leg of which, and through the parallel web portion of bracket 46 and the upper end of bracket 41, a pin 48 extends, such pin supporting between the web portion of bracket 46 and the outer leg of the supporting portion 47 a dog or pawl 49, which is adapted to cooperate with the teeth 38 of the collar 37 to retain such collar in adjusted position.

The outer end of spring 36 is anchored in the hub 51 of an arm 52, which is suitably journaled upon the shaft 39 between bracket 42 and the outer end of spring 36 for rotation in a substantially vertical plane. The free end of lever 52 is suitably connected with one end of a chain or cable 53, which is adapted to wind upon the helically grooved drum 32. The outer end of shaft 39 is provided with a polygonally shaped portion 54 upon which a suitable crank handle may be mounted to initially tension the coil spring 36. Such initial tensioning is transmitted to the right hand end of the spring 36 through the ratchet wheel or toothed collar 37, 38 and this initial tension is maintained by the engagement of the dog 49 with the teeth of said collar. Disengagement of this dog enables the initial tension to be backed off through the shaft 39, for obtaining a lower initial tension if desired. The mounting of the spring 36 on the shaft 39, which is separate and apart from the winding shaft 28, thus facilitates making these tension adjustments.

It will be noted that, in the dumped position of the doors as shown in Figure 1, chain 53 is wound upon its drum 32, bringing the free end of lever 52 up to a proximate position with respect to the drum 32. This is the maximum upward swinging position of arm 52. When the doors are moved to closed position, arm 52 rotates in a counterclockwise direction, as viewed in Figure 2, and with the doors in closed position arm 52 assumes the downwardly extended dotted line position shown in Figure 2. It will be clearly apparent that the angular displacement of arm 52, between its two extreme positions, is substantially less than one-half revolution thereof, so that a relatively small range of deflection or torsional displacement is transmitted to the coil spring 36, even though the winding drums 31, 33 are caused to rotate one or more revolutions. As has been hereinbefore pointed out, to obtain maximum efficiency and to avoid objectionably sharp increases of stress in the case of a relatively short heavy coil spring, the limits of torsional displacement should preferably not exceed one convolution. Thus, since arm 52 is angularly displaced in both opening and closing movements of the doors for less than one revolution, the coil spring 36 is subjected to deflection or displacement only within the limits above defined.

It will, of course, be understood that the spring is of such capacity that the weight of the load acting downwardly on the dumping doors when the latter are tripped, creates sufficient tension in the spring to raise the doors to closed position after the weight of the load is removed therefrom.

It is desirable that the doors be positively retained in closed position to support a load and, upon dumping of the load, it is further desirable that the doors be retained in open position until the vehicle has been moved away from the pile of material deposited so that they may be freely returned to closed position without interference from the pile of material. To this end, the dumping of the doors is effected by the tripping of a suitable ratchet mechanism, and, in like manner, the spring actuated return of the doors to closed position is effected by the tripping of such ratchet mechanism. A single ratchet mechanism may be employed for both operations, a preferred form of such ratchet mechanism being illustrated in the form of a unit in Figures 1 and 3.

Such ratchet mechanism, generally indicated at 55, comprises a ratchet wheel 56 having peripheral notches therein defining regular peripheral teeth 57, such wheel being fixedly secured to the shaft 28 by means of one or more keys 58, the teeth 57 being adapted to cooperate with a ratchet pin 59 carried in the bifurcated upper end of a lever 61 of substantially U-shaped configuration, the intermediate portion 62 of which is journaled upon a pin 63 mounted in the bifurcated upper end of a link 64. Pin 63 has its ends extending beyond the legs of the bifurcated link 64. A pair of parallel links 65 have their outer ends pivotally connected to the outer ends of pin 63 and are suitably retained from displacement on said pin. The forward ends of links 65 are pivotally connected to the upper end of a bracket 66 suitably secured to the lower corner of the rear end of the bed. The lower end of link 64 is pivotally connected to the upper bifurcated end of a similar link 67 by a pin 68, the outer end of which extends beyond the outer leg of link 67 for a purpose to be hereinafter described. The lower end of link 67 is pivotally connected at 74 to the bracket 66. The inner leg of link 67 is provided with a lug or extension 69 to which one end of a coil spring 71 is anchored, the other end of such coil spring being anchored to the bracket 66. Spring 71 draws the knuckle pin 68 forwardly toward the bracket, causing the extending end of pin 68 to engage a rearwardly extending ear 72 provided on the bracket 66, said ear constituting a support for an operating or tripping lever 73 pivotally carried thereby upon a pin 73'. With the spring 71 holding the knuckle pivot pin 68 against the ear 72, this knuckle pivot lies slightly to the front of a line extended between the upper and lower pins 63 and 74, respectively. Hence, the toggle joint formed by links 64 and 67 is held in locked position, the upper member 64 being prevented from swinging downwardly and inwardly by the engagement of the pin 68 with the ear 72. The upper member 61 is provided with a downwardly and rearwardly extending lug 75, to which one end of a coil spring 76 is anchored, the other end of the spring being anchored in an outwardly extending lug 77 provided upon the journaled intermediate portion connecting the lower portions of link 64. This spring 76 is of such strength as to have a tendency to normally urge the upper member 61 substantially to align itself with link 64, this tendency being effective upon the upper member 61 whether the member is to one side or the other of its pivot 63. The intermediate portion of the tripping lever 73 is provided with a suitable perforation for the reception therein of a tripping rod 203 extending along the lower side of the bed and forwardly thereof to the front end of the bed, providing a remote control for an operator positioned in advance of the vehicle. This remote control connection will be described in detail in connection with the description of the showing in Figure 13.

As illustrated in Figures 1 and 3, with the doors in dumped position, the ratchet mechanism parts assume the position thereof illustrated in full lines in Figure 3. At this time, the toggle connection between links 64 and 67 is maintained in locked position, thereby preventing oscillation of the upper member 61 about its pivot in a counterclockwise direction, whereby spring return rotation of ratchet wheel 56 and, consequently, of shaft 28 is restrained. A pull upon the operating rod connected with tripping lever 73 oscillates the upper end of such lever rearwardly or in a counterclockwise direction as viewed in Figure 3, thereby forcing the knuckle pivot 68 rearwardly into a past center relation to the line extended between the upper and lower pins 63 and 74, respectively, whereupon the toggle connection falls rearwardly and downwardly, moving the pin 68 downwardly about the pin 74 as a center, thereby freeing the pivot pin 63 and pawl 61 to move downwardly. The wheel 56 and its associated shaft 28 are now free to rotate in spring return direction of rotation of the shaft to permit closing of the doors. As the wheel 56 rotates in such direction, the pin 59 is carried around to the dotted line position illustrated in Figure 3 and idly oscillates into and out of the ratchet teeth 57, since the toggle arrangement is ineffective at this time. After such tripping of the lever 73, the operator may immediately release the lever, the spring 71 becoming promptly effective to return the knuckle pin 68 to its original past center position, whereupon, as soon as the doors have been returned to fully closed position, the ratchet mechanism then becomes effective to restrain reverse rotation of the shaft 28. After the vehicle has been again loaded, and it is subsequently desired to dump such load, a pull upon the tripping lever 73 again breaks the toggle connection, rendering the pawl or pin 59 ineffective to restrain rotation of the shaft to dumping position, whereupon, upon completion of the dumping operation, the parts assume the positions shown in Figures 1, 2 and 3.

Coming now to the embodiment disclosed in Figures 4 to 8, inclusive, we have shown a door operating and control mechanism adaptable for controlling dumping and spring return movements of the doors of a four door vehicle of the balanced type illustrated in the Benbow and Green patent above noted, wherein dumping of the front compartment load is precluded prior to the dumping of the rear compartment load. In the present construction but a single spring return means is employed to return both sets of doors to closed position.

Referring more particularly to Figure 4, the improved mechanism comprises a pair of axially aligned shafts 81 and 82 disposed for rotation transversely of one end of the vehicle bed, preferably at the rear end, such shafts being journaled in spaced bearing brackets 83 and 84, and 85 and 86, respectively, the brackets being suitably secured to the end of the bed. The inner ends of shafts 81 and 82 are disposed in proximate relation, but are adapted to have relative rotative movement with respect to each other. The outer end of shaft 81 carries thereon a helically grooved drum 87 upon which a cable or chain suitably associated with the rear compartment doors is adapted to wind. Similarly, the outer end of shaft 82 carries thereon, and fixedly secured thereto, a helically grooved drum 88 upon which a chain or cable, connected with the front compartment doors, is adapted to wind.

Mounted concentrically of the shaft 81 and adjacent the outer end thereof, is a rather heavy helical spring 89 in which energy is stored by the tensioning thereof in the dumping operation of shaft 81, such energy being then employed for returning the shaft to door closed position. The outer end of the spring has anchored connection with a collar 91 rotatably mounted on the shaft 81 and disposed in proximity to the bearing bracket 84. Collar 91 is provided with radially inwardly directed recesses or holes 92 extending inwardly from the outer periphery thereof, and bracket 84 carries thereon a member 93 disposed preferably above collar 91 and carrying thereon a suitable locking pin 94 which is adapted to take into the holes 92 to retain the collar 91 in desired adjusted position. The inner end of spring 89 has anchored connection with a collar 95 suitably keyed to the shaft 81. The outer end of shaft 81 is provided with a polygonally-shaped reduced portion 96 over which a suitable crank handle is adapted to take, which crank handle may be utilized to rotate the shaft 81 in a direction to lower the doors, should it be desired to move the doors to dumped position when there is no load in the wagon.

A novel clutching means, generally indicated at 97, is adapted to provide a lost motion connection between shafts 81 and 82 when it is desired, in the course of operation of the doors of the dumping vehicle, to permit relative rotation between the two shafts. This clutching mechanism 97 comprises a collar or disc 98 suitably keyed to shaft 81 adjacent the inner end of such shaft, such collar being provided along its inward lateral face with a laterally projecting radial lug 99. Similarly, shaft 82 carries thereon, adjacent the inner end thereof, a collar 101 suitably keyed thereto and having a laterally inwardly projecting lug 102 extending radially inwardly from the outer periphery thereof along the inner lateral face thereof. The outer sides or faces of the collars 98 and 101 are disposed in proximity to the brackets 83 and 85, respectively. Loosely carried by the proximate ends of the shafts 81 and 82 and between the inner faces of collars 98 and 101 is a collar 103 having a radially outwardly extending lug 104, such lug being of sufficient length to be engaged by either or both lugs 99 and 102. Lugs 99 and 102, however, are not sufficiently long to interengage, and preferably are of such length as to freely pass each other. Thus, when shaft 81 is adapted to be rotated in dumping direction, as indicated by the arrow A in Figure 8, lug 99 may freely rotate for approximately one revolution thereof until it engages lug 104, and upon such engagement may continue to rotate by carrying collar 103 around with it for approximately another revolution prior to the engagement of the lug 104 with the lug 102. From such a position, when the rear compartment doors are released for spring return movement, a similar action takes place, restoring the parts to the position illustrated in Figures 7 and 8. It will, of course, be readily apparent that, if shaft 82 is to be permitted to rotate in dumping direction as indicated by the arrow A in Figure 8, lug 102 carries around with it lug 104, which in turn, by its engagement with lug 99, carries disc 98 and shaft 81 around with it.

Thus shaft 81 may be released to permit dumping movement of the rear compartment doors without in any way effecting dumping movement of the front compartment doors. However, when the shaft 82 is adapted to be rotated to permit dumping of the front compartment, if shaft 81 is in the position illustrated in Figures 7 and 8, it must be permitted to rotate with shaft 82.

The dumping and closing movements of shaft 81 are controlled by a two-way ratchet mechanism, generally indicated at 105. This ratchet mechanism comprises a ratchet wheel 106 having peripheral teeth 107, the wheel being fixedly keyed to the shaft 81, teeth 107 being adapted to cooperate with a ratchet pin 108 carried in the bifurcated upper end of a link 109, the intermediate portion of such link being journaled upon a pin 111 mounted in the bifurcated upper end of a link 112. Pin 111 has its ends extending beyond the legs of bifurcated link 112 and a pair of parallel links 113 have their outer ends pivotally connected to the outer ends of pin 111 and are suitably retained from displacement from such pin. The rear ends of links 113 are pivotally connected to the upper end of a bracket 114 secured to the rear side of the rear end of the bed. The lower end of link 112 is pivotally connected to the upper bifurcated end of a similar link 115 by means of a pin 116, such pin extending outwardly beyond the outer leg of link 115 for a purpose to be hereinafter described. The lower end of link 115 is pivotally connected to the bracket 114 on a pair of ears 117 by means of a pin 118. One end of a coil spring 119 has anchored connection with an upwardly extending projection 121 provided on the outer leg of link 115, the other end of such spring 119 having anchored connection with pin 122 constituting the pivotal connection between the links 113 and bracket 114. Spring 119 draws the knuckle pin 116 forwardly towards the bracket, causing the extending end of pin 116 to engage a rearwardly extending ear 123 provided on bracket 114, said ear constituting a stop limiting the forward movement of the knuckle pin 116. With the spring 119 holding the knuckle pivot 116 against the ear 123, such knuckle pivot lies slightly to the front of a line extended between the upper and lower pins 111 and 118. Hence, the toggle joint formed by links 112 and 115 is held in locked position, the upper member or link 109 being prevented from swinging forwardly. The intermediate portion of the upper link 109 is provided with a downwardly extending lug with which one end of a coil spring 124 has anchored connection, the other end of the coil spring 124 having anchored connection with an outwardly extending lug provided on the journaled intermediate portion of link 112. This spring is of such strength as to have a tendency to normally urge the upper link 109 to align itself in a vertically extending radial relation to the ratchet wheel 106. This tends to hold the ratchet pin 108 in the teeth of the ratchet wheel and this tendency is effective upon the upper link 109 whether the pin 108 is to one side or the other of its pivot 111. Tripping of the ratchet mechanism is accomplished by a tripping arm 125 carried by a horizontally disposed shaft 126. Such shaft 126 extends through a tubular shaft 127 and outwardly beyond the outer end thereof, and carries at its extreme outer end a tripping lever 128.

A pull upon the tripping lever 128 oscillates the lug or lever 125, carried by rod 126, in a counterclockwise direction as viewed in Figure 5, thereby forcing the knuckle pivot 116 outwardly into a past center relation to the line extended between pins 111 and 118, whereupon the toggle connection folds outwardly and downwardly, moving the pin 111 downwardly about the pin 122, thereby swinging the ratchet pin 108 from the teeth 107 of wheel 106. The wheel and its associated shaft 81 are now free to rotate in dumping direction or toward the right. As the wheel 106 rotates in such direction, the pin 108 is carried around in a clockwise direction as viewed in Figure 5, pin 108 idly oscillating into and out of the ratchet teeth 107 as the shaft 81 continues to rotate in dumping direction. During this operation, the tripping lever 128 may be released, whereupon spring 119 becomes promptly effective to return the knuckle pin 116 to its original past center position with respect to the line connecting pins 111 and 118, thus again locking the toggle connection formed by links 112 and 115. Upon completion of the dumping operation, ratchet mechanism 105 is then effective to prevent return rotation of the shaft 81, thus retaining the doors of the rear compartment in dumped position. After the vehicle has been moved away from the deposited pile of material, a second pull upon the tripping lever 128 will again break the toggle connection between links 112 and 115, releasing shaft 81 for spring return rotation under the influence of spring 89.

The operation of shaft 82 is similarly controlled by a ratchet mechanism, generally indicated at 131, but, in view of the clutch connection 97 between shafts 81 and 82, it is only necessary that shaft 82 be controlled to restrain its movement in dumping rotation.

Ratchet 131 also comprises a ratchet wheel 132 suitably keyed to shaft 82 and provided with peripheral ratchet teeth 133. Such teeth 133 are adapted to cooperate with a ratchet pin 134 mounted in the bifurcated upper end of a substantially Y-shaped lever 135, the intermediate portion of which is pivotally supported upon a pin 136 in the bifurcated upper end of a link 137. The lower end of link 137 has pivotal connection by means of a pin 139 with a pair of spaced ears 138 extending rearwardly from bracket 114. Also supported on plate 114 and beneath ratchet mechanism 131 is the tubular shaft 127, the inner end of which is provided with a camming lever 141 adapted to engage the rear edge of the leg or tail portion 142 of the Y-shaped lever 135. The other end of tubular shaft 127 carries thereon a tripping lever 143. A rearwardly extending projection 144 provided upon the rear face of plate or bracket 114 is adapted to engage the hub portion of lever 135 to limit the forward movement thereof. A coil spring 145 has one end thereof anchored in a rearwardly extending lug 146 on the bracket 114, the other end of such spring having anchored connection with the hub portion of lever 135. This spring 145 tends to constantly urge the pin 136 inwardly toward the plate or bracket 114, such movement, as has been hereinbefore pointed out, being limited by the projection 144. The limiting function of projection 144 permits the pin 136 to normally lie beyond or forwardly of a line connecting pins 134 and 139, thereby causing the toggle connection formed by lever 135 and link 137 to be normally held locked. A tension spring 147 connected between the lever arm 142 and lug 146 tends to rotate toggle lever 135—142 clockwise to aid restoration of such toggle lever to its normal position illustrated in Fig. 6. In the position of the parts shown in Figure 6, shaft 82 is restrained from rotation in dumping direction.

A pull on the tripping lever 143, in the direction indicated by the arrow at the lower end thereof, causes the cam lever 141 to break the toggle connection between lever 135 and link 137, whereupon wheel 132 will be free to rotate in dumping direction, during which interval pin 134 will be carried around in a clockwise direction as viewed in Figure 6 and will oscillate idly over the teeth 133 of wheel 132. It will be readily apparent that ratchet mechanism 131 is ineffective to restrain rotation of the shaft 82 in spring return direction rotation of shaft 82, but such rotation will carry the ratchet pin 134 back to its normal position illustrated in Figure 6.

In operation, assuming that the rear compartment doors are in closed position, a pull upon tripping levers 128 and 143 will cause release of the ratchet mechanisms 105 and 131, thereby freeing shafts 81 and 82 for rotation to dumping position of all doors of the vehicle. At the start of such dumping operation, lug 102, associated with shaft 82, will abut lug 104, and the latter in turn will abut lug 99 associated with shaft 81, whereupon shafts 82 and 81 will be caused to rotate in unison in dumping direction. During such rotation of the shafts, spring 89 will be tensioned, and, upon completion of the dumping movement of all doors, ratchet mechanism 105 will become effective to restrain reverse rotation of shaft 81 and, consequently, shaft 82, whereby the doors will be retained in open position until the vehicle has been moved away from the deposited pile of material. Upon subsequent tripping of the ratchet mechanism 105, the spring 89 will become effective to rotate shaft 81 in spring return direction and such movement of the shaft 81 will impart similar movement to shaft 82 through the clutch mechanism 97. In the course of such return movement of shaft 82, ratchet mechanism 131 will be restored to its original effective position for restraining dumping rotation of the shaft 82, as shown in Figure 6. As has been heretofore explained, shaft 81 may be independently released for dumping rotation, whereby the rear compartment load may be dumped independently of dumping of the front compartment load. It will be further readily apparent that when the rear compartment doors are in closed position, tripping of lever 143 and release of ratchet mechanism 131 will be ineffective to permit dumping of the load of the front compartment until ratchet mechanism 105 is likewise tripped. Thus, an attempt by an operator to dump the front compartment load prior to dumping of the rear compartment load is precluded. Of course, it will be readily apparent that if it is desired to dump both compartment loads simultaneously, tripping of both levers 143 and 128 simultaneously with the compartments loaded, will cause release of both shafts 81 and 82 for simultaneous rotation, whereupon both front and rear compartment loads may be concurrently dumped.

Referring now more particularly to Figures 9 to 12, inclusive, we have illustrated a further embodiment of the present invention in a four door dump vehicle of the balanced support type in which a novel operating arrangement is established between the doors and the return spring to insure wide opening of the doors.

Referring more specifically to Figure 9, we have illustrated in perspective a dump vehicle of the character disclosed in the Benbow and Green patent above noted, such type of vehicle comprising, by way of example, a main frame 151, a load carrying bed or hopper 152 carried or supported thereon, and a pair of endless track laying or creeper tread units 153 on which the frame and bed are supported through arched axle brackets (not shown) extending outwardly and downwardly on opposite sides of the frame and intermediate the ends thereof.

The vehicle bed is preferably divided into two compartments fore and aft by a suitable partition. Two pairs of doors 154 are adapted to close the bottoms of such compartments and may have any suitable hinged or pivotal connection with the bed or frame, such, for example, as by hinge eyes 155 secured to the outer edges of the doors and having swinging and vertically sliding engagement with suitable hinge brackets or bars 156 secured in spaced relation longitudinally of the side members of the main frame 151. The front ends of the side portions of the main frame 151 are secured to an elevated platform or frame extension 157, such extension being, in most instances, adapted to be supported on a wheeled truck 158, although this construction is such that the wheeled truck may be easily removed, whereby the front end of the vehicle may be mounted directly on a tractor or other pulling vehicle.

In the present instance, the door operating and control mechanisms are preferably supported at the front end of the vehicle bed. Referring now more particularly to Figures 10, 11 and 12, the operating mechanism embodying the salient features of the present invention comprises a pair of axially aligned transverse shafts 161 and 162, the former being adapted to control the dumping and closing movements of the rear pair of doors, while the latter is adapted to control the dumping and closing movements of the front pair of doors. Shafts 161 and 162 are suitably supported in spaced brackets 163, 164, 165 and 166, suitably secured to the front end of the hopper bed 152, the proximate ends of shafts 161 and 162 being disposed between brackets 164 and 165. The outer end of shaft 161 is provided with a helically grooved pulley or drum 167, upon which a cable or chain 168 (see Figure 9) is adapted to wind for controlling the movements of the rear doors. The pulley or drum 167 has a suitable securing means at its outer end such as a bracket or yoke (not shown) to which the end of the chain 168 is secured, as will be hereinafter more fully described. Shaft 162 carries thereon, substantially centrally of the width of the vehicle bed, two spirally grooved winding drums or sheaves 169, and at its outer end another spirally grooved sheave or drum 171. Winding upon the two intermediate drums 169 are suitable chains or cables 172 extending downwardly to approximately the meeting edges of the front doors, from which they extend lengthwise of the doors, either through channels or tubular guides formed at the meeting edges of the doors, or under the doors, in suitable guides therefor. The rear ends of the flexible members 172 are connected to an equalizing member (not shown) which is, in turn, connected to a chain or cable 173 passing over a suitable guide sheave and thence along the outer side and adjacent the top edge of the bed back to the winding drum 171 on the outer end of shaft 162 (see Figure 9).

At the proximate ends of the shafts 161 and 162, and between bearing brackets 164 and 165, a clutch mechanism 174, similar to the clutch mechanism 97 disclosed in connection with Figures 4, 7 and 8, is provided, whereby dumping and return movements of the rear pair of doors may be carried out independently of the front pair of doors, and whereby dumping and closing movements of the front pair of doors are dependent upon movements of shaft 161 which controls the rear pair of doors.

Ratchet mechanisms of substantially the same type as are disclosed in connection with the operating mechanisms illustrated in Figures 4, 5 and 6, are provided, ratchet mechanism 175 being substantially a duplicate of ratchet mechanism 105 for controlling movements of shaft 161, being of the two-way transposable type. Ratchet mechanism 176, associated with shafts 162 for controlling the dumping movement of the front pair of doors, is a substantial duplicate of ratchet mechanism 131, illustrated in Figures 4 and 6, being of the one-way type. Thus, as in the case of the embodiment disclosed in Figures 4 to 8, inclusive, dumping of the rear pair of doors, where it is desired to dump the compartments independently of each other, must be first carried out before the load in the front compartment may be dumped.

The spring return mechanism of the present embodiment comprises a spring 177 concentrically coiled about a shaft 178 suitably journaled in bearing brackets such as 179 supported on the platform or frame extension 157. The spring and cooperating parts may be of the same general character as those disclosed in connection with the embodiment of Figure 1, with the exception of the mechanism for transmitting motion from the spring actuated shaft 178 to the winding shaft 161. Suitably secured to the outwardly extending end of the shaft 178 is an arm 181 constituting a portion of the motion transmitting connection between the spring return mechanism and shaft 161 controlling the movements of the rear compartment doors.

Referring more specifically to Figure 11, arm 181 comprises an arm portion 182 extending radially from hub 183 which embraces the outer end of shaft 178, this arm 181 being provided with a substantially right angularly disposed camming portion 184 extending from hub 183, the cam face 185 thereof having its radius of curvature increasing from the hub 183 outwardly to its outer end. The outer end of arm portion 182 is connected to a portion of the grooved drum 167 carried at the outer end of shaft 161 by means of a chain or cable 186 (see Figure 11). The connecting end of the chain 186 is secured to a suitable yoke or bracket on the inner end of the drum 167, or at the opposite end from the connected end of the chain 168. It will thus be evident that chains 168 and 186 are alternately wound upon the drum 167, while the other of said chains is being unwound therefrom. That is, when the doors 154 are closed, chain 168 will be wound upon the drum 167, while at the same time the chain 186 will be unwound therefrom, the latter assuming the position as shown in dotted lines in Figure 11. Conversely, when the doors reach their maximum opened position, the chain 168 will be substantially entirely unwound from the drum 167, while chain 186 will be wound upon the drum its maximum extent, as illustrated in full lines in Figure 11. It is understood that the winding drum 167 is so designed that neither of the chains 168, 186 completes more than two revolutions thereon, so that no interference will occur between the chains. The lifting chains have been omitted from the drums 167, 169, 169 and 171, of the drawings, for the sake of clearness.

When the doors are in their closed positions the arm 181 assumes the position approximately illustrated in dotted lines in Figure 11, with the chain 186 extending from the end of said arm down around and under the cam 184 and thence up to the drum 167. When the ratchet mechanism 175 is tripped and the doors start to dump, the tension transmitted through the chain 186 is effective on the winding spring shaft 178 through a relatively short lever arm, corresponding in length to the smallest radius of the cam 184. However, at this time, the weight of the load is exerting its maximum pressure on the doors, by reason of the entire weight acting thereon and by reason of the doors being disposed at right angles to the downward thrust of the load, and hence the pressure exerted on the doors transmits winding rotation to the shaft 178, notwithstanding the short lever arm at the minimum radius of the cam 184. As the doors move downwardly, dumping part of the load and diminishing the effectiveness of the angle of the doors against which the load bears, the oscillation of the cam 184 presents a continuously increasing lever arm through which the pull of the chain transmits winding rotation to the shaft 178. As the doors approach their wide open positions, the end of the long lever arm 181 swings around to a position where the pull of the chain has a maximum effect thereon and hence, by virtue of this largely increased mechanical advantage through which winding rotation is transmitted to the return spring, the doors are enabled to swing downwardly to a wide open position, notwithstanding the fact that the tension of said spring is continuously increasing and the force of the load acting against the doors is continuously decreasing. This varying ratio of mechanical advantage insures complete dumping and prevents spreading of the load or the possibility of difficulty of closing the doors through their failure to open to a sufficient width. Conversely, this arrangement is also of advantage in the operation of closing the doors. With the tripping of the ratchet mecahnism for a return movement of the doors, after the wagon has drawn away from the pile, the doors in their substantially vertical position do not require much effort to start them swinging inwardly and upwardly, and the long radius of the arm 181 can transmit enough effort to effect such movement. However, as the doors approach their closed position, their weight establishes a higher reacting pressure, but at this time the return spring is acting through the diminishing radius of the cam 184 and, hence, the increasing moment of the doors is compensated. Accordingly, the doors are closed with a rapid, accelerating movement which insures their being swung up to completely closed position. This construction may be embodied in a cart type of vehicle having only one pair of doors extending from end to end of the bed, or it may be embodied in a vehicle having separate front and rear pairs of doors, such as we have illustrated in Figures 9 and 10, and in either of these constructions the same operating principle will follow in the closing of a single pair of doors, or the rear pair of doors, and will also follow in the closing of two pairs of doors, inasmuch as in the construction illustrated the means for closing the front pair of doors is dependent for its operation upon the means for closing the rear pair of doors. In this connection, it is to be noted that a varying ratio of mechanical advantage is also present in the embodiment of Figures 1 and 2, since the effective moment arm or radius of lever 52 changes with the different angular positions of said lever.

Inasmuch as the operating and control mechanisms disclosed in Figures 9 to 12, inclusive, are located upon the elevated forward frame extension 157 where such mechanisms are liable to be affected by spillage of material being loaded into the bed, we have provided a cover member 183 which houses the movable elements of the mechanisms from harmful effects of such spillage.

In Figure 13 we have illustrated a fragmentary perspective view of a single compartment dump vehicle in which an operating and control mechanism for the doors thereof is mounted at the rear end of the vehicle, showing a novel form of remote control mechanism extending forwardly of the vehicle for operation by an operator positioned in advance of the vehicle for controlling tripping or releasing of the ratchet mechanism associated with the door operating and control mechanism. In the exemplary type of vehicle illustrated, the dump wagon or cart comprises a main frame 191, a load carrying bed or hopper 192 carried or supported thereon, and a pair of endless track laying or creeper tread units 193 on which the frame and bed are supported through arched axle brackets, such, for example, as 194, extending outwardly and downwardly on opposite sides of the frame and intermediate the ends thereof. The open bottom of the bed 192 is normally closed by a pair of dump doors such as 195, which may have any suitable hinged or pivotal connection with the bed or frame, such, for example, as by hinge eyes 196 secured to the outer edges of the doors and having swinging and vertically sliding engagement with suitable hinge brackets or bars 197 secured in spaced relation longitudinally of the side members of the main frame 191. The forward end of the vehicle is provided with an elevated frame extension 198 of substantially trunk-like configuration, such extension being provided at its forward end with a suitable draw head 199 adapted to be connected directly to a tractor or other pulling vehicle.

The side members of the vehicle bed 192 are suitably reenforced by vertically extending angle members, such as 201, while the ends of the bed may be suitably reenforced by angle members 202. To effectively control a ratchet mechanism such as 55, illustrated in connection with the operating mechanism shown in Figure 1, the tripping lever of such ratchet mechanism is controlled by a rod 203 slidably extending along the lower edge of the vehicle bed 192 and adjacent the side member of the main frame 191 through suitable perforations 204 provided in the angle reenforcing members 201. At its forward end, the operating rod 203 is pivotally connected to an arm 205 of a crank 206 terminating at its end opposite the arm 205 in another arm 207, the free end of which has suitably connected thereto a flexible member 208, such as a rope, extending forwardly along the trunk-like draft member 198 and through a suitable guide means, such, for example, as an eye 209, such flexible member 208 being of sufficient length to reach to the propelling vehicle for accessibility to an operator thereof. The crank member 206 may be journaled in a pair of spaced brackets 211 suitably secured to the front end outer face of the vehicle bed. To provide for free swinging movement of the crank 206, such crank may be provided with a bowed intermediate portion 212, and the angle iron 202 over which such intermediate portion is adapted to swing is provided with a cutaway notch 213 to accommodate such intermediate portion 212 of crank 206 when the crank is rotated for tripping of the ratchet mechanism. A tension spring 214 is concentrically mounted on rod 203 between the front end reenforcing member 201 and the front end of the bed, and has one end anchored to such reenforcing member, the front end of such coil spring 214 being suitably anchored to the arm 205 of crank member 206, whereby spring 214 normally tends to urge the rod 203 rearwardly for normally maintaining the tripping lever of the ratchet mechanism in inoperative condition. By employing a flexible member, such as 208, it will be readily apparent that when the vehicle bed is being loaded by a mechanism such as a steam shovel or crane, any spillage of materials which might take place over the front end of the vehicle bed, will have no effect upon the remote control connections for operating or tripping the ratchet mechanism, since a slight amount of slack in the rope 208 will prevent actuation by spillage. In constructions having two tripping levers, represented by the levers 128 and 143 in Figure 4, the rod 203, crank 206 and rope 208 will merely be duplicated for the other tripping lever. It will be noted that when the operator on the tractor or other pulling vehicle desires to dump the doors to open position or to restore the doors to closed position he merely jerks on the rope or ropes 208, a pull thereon serving to dump the doors and a pull thereon serving to restore the doors. The rope may be relaxed immediately after pulling, as there is no need of holding the rope for any predetermined length of time in either the dumping or restoring operation.

Coming now to the embodiment disclosed in Figure 14, we have fragmentarily illustrated a portion of a spring return mechanism such as may be employed with the embodiment disclosed in Fig. 1, but it is to be understood that this type of spring return mechanism has merely been chosen as exemplary, the novelty disclosed therein being adaptable to the other modified forms of spring return mechanisms disclosed herein. As in the case of the embodiment disclosed in Figure 1, a coil spring 221 has anchored connection at its inner end with a disc or collar 222 fixedly secured or keyed to a shaft 223 at the inner end thereof in proximate relation to an upwardly extending bearing bracket 224. The other end of the coil spring 221 has anchored connection with the hub portion of a lever 225 which is rotatably journaled upon shaft 223 and which may be maintained in abutment with the outer bearing bracket 226 providing the outer end journal bearing for shaft 223. The improvement in the present embodiment resides in the provision of means for preventing buckling of the coil spring 221 due to the relatively great torsional stresses to which spring 221 may be subjected in the course of operation of the dump doors of a vehicle with which it is associated. The improved means comprises the provision of a reduced portion 227 on the collar 222 and a similar reduced portion 228 provided on the hub of the lever 225. Associated with, and seated on, the periphery of the reduced portion 227 is a sleeve 229 which is of slightly smaller diameter than the inner periphery of the coil spring 221, the other end of the sleeve being seated on the outer periphery of a collar 231 disposed approximately at the center of shaft 223. Similarly, a metallic tube or sleeve 232 has one end thereof seated about the reduced portion 228 of the lever 225, extending inwardly and having its inner end seated upon a collar 233 disposed proximately to the collar 231. It will be readily apparent that sleeves 229 and 232, in conjunction with the associated reduced portions and collars 231 and 233 will readily prevent any buckling action of spring 221. By providing collars 231 and 233 at substantially the median portion of the shaft 223, suitable reenforcing means is provided for the sleeves 229 and 232 at the point where the greatest buckling tendency of spring 221 exists. It will be of course readily understood that collars 231 and 233 may be replaced by a single collar of sufficient depth to accommodate the inner proximate ends of the sleeves 229 and 232.

In conjunction with the embodiment disclosed in Figure 14, we have also illustrated a modified form of locking means for maintaining initial tension imparted to spring 221 by the rotation of shaft 223. This means comprises a slidable bolt or plug 234 which may pass transversely through bearing plate 224 and suitably engage either one-way ratchet teeth or perforations provided laterally of, or transversely of, the collar 222, respectively. Thus, initial tension may be imposed upon spring 221 and, when the predetermined tension has been reached, bolt or plug 234 may be inserted through the bearing plate 224 for engagement with the cooperating ratchet teeth or perforations provided in collar 222.

Referring now more particularly to Figures 15 and 16, we have illustrated another embodiment of the present invention incorporating novel features in an operating and controlling mechanism for four door vehicles of the two compartment type in which dumping of the load of the front compartment in advance of dumping of the load of the rear compartment is precluded. Such operating and controlling mechanism comprises a pair of axially aligned shafts 241 and 242, the former controlling dumping and spring return operation of the rear compartment doors, while the latter controls the operation of the front compartment doors. Shaft 241 carries fixedly secured or keyed thereto a ratchet wheel 243 with which a ratchet mechanism of the two-way transposable type 244 of the character disclosed in connection with the embodiment illustrated in Figure 1 is employed. The tripping mechanism for ratchet mechanism 244 comprises a tripping arm 245 suitably secured to a rotatable shaft 246 suitably journaled in a pair of spaced bearing brackets 247, shaft 246 carrying at its end, extending inwardly beyond the inner bracket 247, a tripping lever 248. A pull on the tripping lever 248 causes arm 245 to engage the toggle pin of ratchet mechanism 244, thereby breaking the toggle connection of such ratchet mechanism and freeing the ratchet pawl thereof for transposition to be effective in the opposite direction.

Shaft 242 is similarly provided with a ratchet wheel 249 cooperating with which is a ratchet mechanism 251, also of the two-way transposable type. Similarly, ratchet mechanism 251 is tripped by an arm 252 carried by a shaft 253 suitably journaled in a pair of spaced bearing brackets 254, the end of shaft 253 projecting beyond the inner bracket 254 having suitably secured thereto a tripping lever 255. A pull on the tripping lever 255 is adapted through arm 252 to break the toggle connection of ratchet mechanism 251 for accomplishing transposition of the pawl means thereof for effecting control of ratchet wheel 249 in the opposite direction of rotation thereof.

Concentrically mounted with respect to shafts 241 and 242 and extending beyond the proximately disposed ends of such shafts between ratchet wheels 243 and 249, is a coil spring 256, one end of which has anchored connection with ratchet wheel 243, while the other end thereof has anchored connection with ratchet wheel 249. One or more sleeves 257 of the character disclosed in Figure 14 are provided about the proximate ends of shafts 241 and 242 to prevent buckling of the spring 256, these sleeves being arranged to permit independent rotation of the shafts. Preferably, the proximate ends of shafts 241 and 242 are disposed adjacent ratchet wheel 243, such ends being maintained in aligned relation by means of a suitable sleeve 258.

It will be understood that shafts 241 and 242 are adapted to rotate in opposite directions upon dumping movement of the associated corresponding doors whereby tension is imposed upon spring 256, which, upon completion of the dumping operation, is then adapted to rotate the shafts in opposite directions to return the associated corresponding doors to closed position. The two shafts can be caused to rotate in opposite directions, one with respect to the other, in the dumping operation and in the return operation, by merely reversing a certain one or ones of the winding sheaves, represented at 31, 32, 33, 87, 88 etc., so that the chain leading to one door will come down from the front side of its sheave and the chain leading to the other door will come down from the back side of its sheave.

The control means for preventing dumping operation of the front compartment doors prior to the dumping of the rear compartment doors comprises a novel means adapted to prevent tripping action of the ratchet mechanism 251 prior to dumping release of ratchet mechanism 244. Carried by shaft 241 is a cam control wheel 261 provided with a pair of spaced peripheral grooves 262 and 263, such grooves being connected with a helical groove 264. A vertically disposed shaft 265 is suitably journaled in a pair of spaced brackets 266, the upper projecting end of shaft 265 carrying thereon and fixedly secured thereto a crank arm 267 having an upwardly projecting lug 268 which is adapted to extend into and cooperate with grooves 262, 263 and 264, as will be more specifically hereinafter described. The intermediate portion of shaft 265 is provided with a laterally extending arm 269 fixedly secured to such shaft and having its free end extending outwardly, such free end providing anchoring connection for one end of a coil spring 271, the other end of such coil spring being suitably anchored to an ear 272 suitably secured to the bracket or mounting plate for the ratchet mechanisms. Arm 269 is adapted to be so controlled by spring 271 as to normally tend to rotate shaft 265 to position lug 268 substantially midway between grooves 262 and 263. Disposed below arm 269 and suitably secured to shaft 265 is a second arm 273 having an extension thereon, with which a control rod 274 is associated, whereby oscillations of the shaft 265 will impart sliding movement to such control rod 274. The inner end of control rod 274 has loose sliding mounting in a hole 248' formed in the tripping lever 248, this mounting permitting reciprocation of the rod and also permitting the rod to be carried sidewise by the lever through the comparatively small range of tripping movement of said lever. When the rod is projected endwise, the end thereof is moved into the path of a shoulder 255' on the other tripping lever 255, whereby that lever cannot be tripped without also tripping the lever 248, but conversely the lever 248 can be tripped without tripping the lever 255. In the normal condition of the mechanism, the crank lug 268 is disposed in the groove 262, at which time the rod 274 occupies the projected position illustrated in Figure 15. When the crank lug has been swung over to the other groove 263, the rod 274 is retracted, at which time the lever 255 can be tripped independently as a sequence operation following the tripping of the lever 248.

With the doors in closed position, a pull on the tripping lever 248 will only cause dumping of the rear pair of doors because the lever 248 can be operated independently of the lever 255. When the rear compartment doors swing down to dumped position, the grooved wheel associated with the shaft 241 will operate to retract locking rod 274, due to the tendency of crank lug 268 to be disposed in a neutral position between grooves 262 and 263 and the coaction of helical groove 264 with this lug, whereby the lug is caused to shift over to the groove 263. Consequently, ratchet mechanism 251 is now free to be tripped independently of the rear door control mechanism and the front compartment load may now be dumped. Subsequent tripping of both ratchet mechanisms will then permit the opposite ends of the spring to restore both pairs of doors to closed position, and in this operation the reverse rotation of the cam wheel 251 will shift the lug 268 back to the groove 262 and will again project the rod 274 into its interlocking relation to lever 255. Of course, the rear pair of doors can be restored to closed position by such subsequent tripping of the ratchet mechanism 244 when the front pair of doors has not been dumped. With the rear doors returned to closed position, the vehicle may be moved to another selected or desired place, and the front compartment load dumped. At this time, locking rod 274 will be in the position shown in Figures 15 and 16. Subsequent tripping of lever 255 to release ratchet mechanism 251 thereby permitting dumping rotation of shaft 242 will of course, effect tripping operation of ratchet mechanism 244, but inasmuch as there is at this time no load upon the rear compartment doors, no movement of such doors to dumping position will take place. Furthermore, dumping rotation of shaft 242 will impose tension upon the corresponding end of spring 256 thereby causing the opposite end of such spring to impose a rotative tendency to ratchet wheel 243 in door return direction. However, the rear compartment doors being closed at this time and therefore in abutment with the bottom of the associated hopper, no further movement of the rear compartment doors in return direction will result. Upon subsequent tripping of lever 255, the front compartment doors will be returned to closed position and the operative and control parts thus restored to the position shown in Figures 15, 16 and 17. With both pairs of doors in closed position and both compartments loaded, a pull on the tripping lever 255 will obviously dump both pairs of doors simultaneously.

Thus, the operating and control mechanism disclosed in Figures 15 and 16 includes the provision of novel means for the ratchet mechanisms such that dumping operation of the rear doors may be effected independently of dumping operation of the front compartment doors, but such operation of the rear compartment doors must have been effected first for independent dumping of the loads of both compartments, otherwise both compartment loads must be dumped simultaneously. If it is desired to retain the doors of the rear compartment in open condition in the event that the vehicle is to be moved a distance of less than the length of the deposited pile of material and thus eliminate the possibility of the rear compartment doors from scooping up some of the deposited material, it will be readily apparent that dumping of the front compartment load may be accomplished independently of return of the rear doors to closed position, since the parts of the control mechanism of the rear compartment doors in the dumped condition of such doors, are so disposed at the time that lock rod 274 is in withdrawn position out of the path of movement of shoulder 255'. With the doors of the rear compartment returned to closed position after dumping and the front compartment still loaded, tripping of both ratchet mechanisms 244 and 251 will only be effective to control dumping and spring return of the front compartment doors as has been heretofore more specifically explained. It is to be noted that in the present embodiment, a single coil spring is employed for spring return of both sets of doors, such spring being associated with both operating mechanisms by having its ends anchored to each operating mechanism so that both ends of the spring are tensioned during dumping operation of the front and rear compartment doors, such spring being effective at its ends to return both sets of doors to closed position. By mounting the spring over the proximate ends of the rotatable members between the two ratchet control mechanisms, a simple, compact and rugged operating and control mechanism for four door vehicles of the front and rear compartment type is provided.

The above described embodiments of the present invention can be readily attached to wagons having manually operated wind-up mechanisms, such as in the exemplary structure disclosed in the Benbow and Green Patent No. 1,706,099, without requiring any extensive alteration or modification of the structure. Hence, the present structures have utility as attachments or accessories for older wagons, in addition to their utility as built-in constructions.

While we have disclosed several preferred embodiments of our invention, it will be understood that we do not wish to be limited thereto, since certain changes may be made therein without departing from the essence of the invention or the spirit and scope of the appended claims.

What we claim and desire to secure by Letters Patent is:

1. In a load carrying vehicle, the combination with a bed and a dumping door closing the bottom of said bed, of a rotatable member, means connecting said member and said door whereby said member is rotated in one direction upon dumping movement of said door and in the opposite direction upon movement of said door to closed position, means for returning said door to closed position comprising a swinging member, a coil spring having one end thereof operatively associated with said swinging member, the other end of said spring being associated with a collar, said swinging member and collar being supported on said bed independently of said rotatable member, means for varying the initial tension of said spring, and means for controlling the rotation of said rotatable member in either direction.

2. In a load carrying vehicle, the combination with a bed and a dumping door closing the bottom of said bed, of a rotatable member associated with said door and rotatable in one direction upon dumping movement of said door and in the opposite direction upon movement of said door to closed position, energy storing means including a spring independently carried by said vehicle, said spring being adapted to be energized by dumping movement of said door and adapted to deenergize in returning said door to closed position, and means mounted coaxially with said energy-storing means and connecting said energy storing means and said rotatable member whereby energization and deenergization of said energy storing means is effected within predetermined small limits of operation of said energy storing means.

3. In a load carrying vehicle, the combination with a bed and a dumping door closing the bottom of said bed, of a rotatable member associated with said door and rotatable in one direction upon dumping movement of said door and in the opposite direction upon movement of said door to closed position, a coil spring independently carried by said vehicle said spring being adapted to be tensioned by dumping movement of said door and adapted to return said door to closed position, and a motion transmitting connection between said spring and rotatable member including link means confining tensioning and untensioning of said spring within limits of less than one convolution of said spring.

4. In a load carrying vehicle, the combination with a bed and a dumping door closing the bottom of said bed, of a rotatable member associated with said door and rotatable in one direction upon dumping movement of said door and in the opposite direction upon movement of said door to closed position, a coil spring carried by said vehicle independently of said member, said spring adapted to be tensioned by dumping movement of said door and adapted to return said door to closed position, means for imposing a predetermined initial tension on said spring, and means connecting said spring with said rotatable member including means confining torsionel distortion of said spring within limits of less than one convolution of overall distortion.

5. In a load carrying vehicle, the combination with a bed and a dumping door closing the bottom of said bed, of a rotatable member associated with said door and rotatable in one direction upon dumping movement of said door and in the opposite direction upon movement of said door to closed position, energy storing means carried by said vehicle adapted to be energized by dumping movement of said door and adapted to deenergize in returning said door to closed position, and means connecting said energy storing means and said rotatable member including means adapted to accelerate closing movement of said door during a portion of such movement.

6. In a load carrying vehicle, the combination with a bed and a dumping door closing the bottom of said bed, of a rotatable member associated with said door and rotatable in one direction upon dumping movement of said door and in the opposite direction upon movement of said door to closed position, energy storing means carried by said vehicle adapted to be energized by dumping movement of said door and adapted to deenergize in returning said door to closed position, and means connecting said energy storing means and said rotatable member including means adapted to vary the mechanical advantage of said energy storing means during returning movement of said door whereby decreasing power of said energy storing means is compensated.

7. In a load carrying vehicle, the combination with a bed and a dumping door closing the bottom of said bed, of a rotatable member associated with said door and rotatable in one direction upon dumping movement of said door and in the opposite direction upon movement of said door to closed position, energy storing means carried by said vehicle adapted to be energized by dumping movement of said door and adapted to deenergize to return said door to closed position, and means connecting said energy storing means and said rotatable member including means whereby energization and deenergization of said energy storing means is effected within predetermined small limits of operation of said energy storing means, said last named means being effective to vary the mechanical advantage of said energy storing means to compensate for loss of power of said energy storing means during closing movement of said door and to accelerate closing movement of said door during the final portion of such movement.

8. In a load carrying vehicle, the combination with a bed comprising two compartments and doors closing the bottoms of said compartments, of a plurality of rotatable means associated with said doors and rotating therewith for dumping and returning said doors to closed position, means responsive to dumping movement of said doors and adapted to return said doors to closed position, and means carried by said rotatable means for cooperating with said rotatable means whereby dumping movement of certain of said doors is precluded prior to such movement of other of said doors.

9. In a load carrying vehicle, the combination with a bed comprising two compartments and doors closing the bottoms of said compartments, of a plurality of rotatable means associated with said doors and rotating therewith to dump and return said doors to closed position, means responsive to opening movement of said doors and adapted to return said doors to closed position, means carried by said rotatable means for cooperating with said rotatable means whereby dumping movement of certain of said doors is precluded prior to such movement of other of said doors, and means cooperating with said rotatable means for accomplishing simultaneous dumping of all of said doors.

10. In a load carrying vehicle, the combination with a bed comprising two compartments and doors closing the bottoms of said compartments, of a plurality of rotatable means associated with said doors and rotating therewith for dumping and returning said doors to closed position, spring means tensioned by opening movement of said doors and adapted to return said doors to closed position, means disposed in axial alignment with said rotatable means for inter-controlling the movements of said rotatable means, and separate detent means controlling said rotatable means whereby certain of said doors may be dumped independently of other of said doors.

11. In a load carrying vehicle, the combination with a bed comprising two compartments and doors closing the bottoms of said compartments, of a plurality of rotatable means associated with said doors and rotating therewith for dumping and returning said doors to closed position, spring means tensioned by opening movement of said doors and adapted to return said doors to closed position, means controlling the movements of said rotatable means, and means mounted concentrically of said rotatable means for inter-connecting said rotatable means whereby certain predetermined doors may be dumped independently of other of said doors or all of said doors dumped simultaneously.

12. In a load carrying vehicle, the combination with a bed comprising two compartments and doors closing the bottoms of said compartments, of a plurality of rotatable means associated with said doors and rotating therewith for dumping and returning said doors to closed position, energy storing means cooperating with said rotatable means and adapted to be energized by said rotatable means upon dumping rotation thereof and adapted to become effective upon said rotatable means to return said doors to closed position, and means providing connection between said rotatable means and including means whereby certain of said doors may be dumped independently of other of said doors or all of said doors dumped simultaneously, said last named means and said energy-storing means being mounted concentrically with respect to said rotatable means.

13. In a load carrying vehicle, the combination with a bed comprising two compartments and doors closing the bottoms of said compartments, of a plurality of rotatable means associated with said doors and rotating therewith for dumping and returning said doors to closed position, energy storing means cooperating with said rotatable means and adapted to be energized by said rotatable means upon dumping rotation thereof and adapted to become effective upon said rotatable means to return said doors to closed position, means providing connection between said rotatable means and including means whereby certain of said doors may be dumped independently of other of said doors or all of said doors dumped simultaneously, and means connecting said rotatable means and said energy storing means including means for varying the mechanical advantage of said energy storing means during return movement of said doors and compensating decreasing power of said energy storing means during such movement.

14. In a load carrying vehicle, the combination with a bed comprising two compartments and doors closing the bottoms of said compartments, of a plurality of rotatable means comprising shafts disposed in axial alignment and associated with said doors and rotating therewith for dumping and returning said doors to closed position, energy storing means cooperating with said shafts and adapted to be energized by said rotatable means upon dumping rotation thereof and adapted to become effective upon said rotatable means to return said doors to closed position, and means interposed between the proximate ends of said shafts for providing connection between said shafts and including means whereby certain of said doors may be dumped independently of other of said doors or all of said doors dumped simultaneously, said energy storing means being connected with one of said shafts.

15. In a load carrying vehicle, the combination with a bed comprising two compartments and doors closing the bottoms of said compartments, of a plurality of rotatable means associated with said doors and rotating therewith for dumping and returning said doors to closed position, energy storing means cooperating with said rotatable means and adapted to be energized by said rotatable means upon dumping rotation thereof and adapted to become effective upon said rotatable means to return said doors to closed position, and means providing connection between said rotatable means and including means whereby certain of said doors may be dumped independently of other of said doors or all of said doors dumped simultaneously, said energy storing means being associated with one of said rotatable means and being supported independently thereof on said vehicle.

16. In a load carrying vehicle, the combination with a bed comprising two compartments and doors closing the bottoms of said compartments, of a plurality of rotatable means comprising shafts associated with said doors and rotating therewith for dumping and returning said doors to closed position, energy storing means cooperating with said shafts and adapted to be energized by said shafts upon dumping rotation thereof and adapted to become effective upon said shafts to return said doors to closed position, and means carried by the ends of said shafts for providing connection between said shafts and including means whereby certain of said doors may be dumped independently of other of said doors or all of said doors dumped simultaneously, said energy storing means comprising a single spring being carried by and connected with one of said shafts.

17. In a load carrying vehicle, the combination with a bed comprising two compartments and doors closing the bottoms of said compartments, of a plurality of rotatable means associated with said doors and rotating therewith for dumping and returning said doors to closed position, energy storing means cooperating with said rotatable means and adapted to be energized by said rotatable means upon dumping rotation thereof and adapted to become effective upon said rotatable means to return said doors to closed position, means controlling the rotation of said rotatable means, and means carried by one of said rotatable means and adapted to be effective upon certain of said control means to prevent operation of the associated rotatable means whereby dumping movement of certain of said doors is precluded prior to other of said doors.

18. In a load carrying vehicle, the combination with a bed comprising two compartments and doors closing the bottoms of said compartments, of a plurality of rotatable means associated with said doors and rotating therewith for dumping and returning said doors to closed position, energy storing means cooperating with said rotatable means and adapted to be energized by said rotatable means upon dumping rotation thereof and adapted to become effective upon said rotatable means to return said doors to closed position, means controlling the rotation of said rotatable means, and means associated with one of said rotatable means and adapted to be effective upon certain of said control means to prevent operation of the associated rotatable means whereby dumping movement of certain of said doors is precluded prior to other of said doors, said energy storing means comprising a single spring being carried by and connected with said rotatable means.

19. In a load carrying vehicle, the combination with a bed comprising front and rear compartments and doors closing the bottoms of said compartments, of a pair of rotatable members, one associated with the front compartment doors and the other with the rear compartment doors, said members being adapted to rotate with their respective doors upon dumping or closing movements of said doors, spring means operatively connected with said rotatable members for returning the doors to closed position after the dumping of the load, and lost motion clutch means providing a connection between said members whereby the rear compartment doors may be actuated independently of the front compartment doors.

20. In a load carrying vehicle, the combination with a bed comprising front and rear compartments and doors closing the bottoms of said compartments, of a pair of rotatable members, one associated with the front compartment doors and the other with the rear compartment doors, said members being adapted to rotate with their respective doors during dumping and closing movements of said doors, spring means associated with one of said members and adapted to be tensioned upon dumping movement of said doors and effective to return said doors to closed position, and lost motion clutch means providing a connection between said rotatable members whereby said rear compartment doors may be actuated independently of said front compartment doors.

21. In a load carrying vehicle, the combination with a bed comprising front and rear compartments and doors closing the bottoms of said compartments, of a pair of rotatable members, one associated with the front compartment doors and the other with the rear compartment doors, said members being adapted to rotate with their respective doors during dumping and closing movements of said doors, spring means associated with one of said members and adapted to be tensioned upon dumping movement of said doors and effective to return said doors to closed position, means controlling the rotation of said rotatable members, and a lost motion connection between said rotatable members whereby said rear compartment doors may be actuated independently of said front compartment doors, and whereby all of said doors may be actuated simultaneously in both dumping and closing movements.

22. In a load carrying vehicle, the combination with a bed comprising front and rear compartments and doors closing the bottoms of said compartments, of a pair of rotatable members, one associated with the front compartment doors and the other with the rear compartment doors, said members being adapted to rotate with their respective doors during dumping and closing movements of said doors, a single spring connected with both of said rotatable members and adapted to be tensioned upon dumping movement of said doors and effective to return said doors to closed position, means controlling the rotation of said rotatable members, and means controlling said controlling means whereby the front compartment doors cannot be dumped prior to the rear compartment doors.

23. In a load carrying vehicle, the combination with a bed comprising front and rear compartments and doors closing the bottoms of said compartments, of a pair of rotatable members, one associated with the front compartment doors and the other with the rear compartment doors, said members being adapted to rotate with their respective doors during dumping and closing movements of said doors, spring means connected with both of said rotatable members and adapted to be tensioned upon dumping movement of said doors and effective to return said doors to closed position, means controlling the rotation of said rotatable members, means controlling said controlling means whereby the front compartment doors cannot be dumped prior to the rear compartment doors, and means effective upon dumping rotation of the rear compartment rotatable member to render said last named control means inoperative whereby the front compartment doors may be dumped subsequently to or simultaneously with the rear compartment doors.

24. In a load carrying vehicle, the combination with a bed comprising front and rear compartments and doors closing the bottoms of said compartments, of a pair of rotatable members, one associated with the front compartment doors and the other with the rear compartment doors, said members being adapted to rotate with their respective doors during dumping and closing movements of said doors, spring means energized by opening movement of said doors and adapted to return said doors to closed position, transposable means controlling the movements of said rotatable members, and clutch means associated with said rotatable members and providing an interconnecting engagement effective to prevent certain of said doors from being dumped previous to the dumping of certain other of said doors.

25. In a load carrying vehicle, the combination with a bed comprising two compartments and doors closing the bottoms of said compartments, of two rotatable members mounted in axial alignment on said vehicle, one of said members associated with the front compartment doors and the other of said members with the rear compartment doors, said members being adapted to rotate with the irrespective doors during dumping and closing movements of said doors, spring means independently of said members and effective to have energy stored therein during the opening movement of said doors, flexible connections for transmitting driving motion between said spring means and said members, whereby said members are adapted to be rotated in the opposite direction by said energy storing means upon completion of the dumping operation to restore said doors to closed position, transposable means effective on each of said members to control the rotation thereof, actuators effective separately on said transposable means to cause independent rotation of said members, and an interconnecting clutch mechanism arranged between said rotatable members whereby rotation of dumping movement of certain of said doors is precluded prior to such movements of other of said doors responsive to said actuators.

26. In a load carrying container, the combination with a dumping door for dumping a load from the container, of a rotatable member, means connecting said member and said door whereby said member is rotated in one direction upon dumping movement of said door and in the opposite direction upon movement of said door to closed position, means for returning said door to closed position comprising a swinging member, means for transmitting motion between said swinging member and said rotatable member, a coil spring having one end thereof operatively associated with said swinging member, the other end of said spring being associated with a collar, said swinging member and collar being supported on said container independently of said rotatable member, and means for controlling the rotation of said rotatable member in either direction.

27. In a load carrying container having two dumping openings therein, the combination with a first dump door for closing one of said openings and a second dump door for closing the other of said openings, of spring means for returning said doors to closed position after the dumping of the load, locking mechanism for holding said first door closed or for holding said first door open, including tripping means operable by movement in one direction to allow said door to open and operable by movement in the same direction to allow said door to close, locking mechanism for holding said second door closed, including tripping means operable to allow said door to open, and means for precluding dumping movement of one of said doors prior to such movement of the other of said doors.

28. In a load carrying container having two dumping openings therein, the combination with a first dump door for closing one of said openings and a second dump door for closing the other of said openings, of spring means for returning said doors to closed position after the dumping of the load, locking mechanism for holding said first door closed against the pressure of the load or for holding said first door open against the closing energy of said spring means, tripping means for releasing said locking mechanism, locking mechanism for holding said second door closed against the pressure of the load, tripping means for releasing said latter locking mechanism, and means for precluding dumping movement of one of said doors prior to such movement of the other of said doors.

29. In a load carrying container having two dumping openings therein, the combination with a first dump door for closing one of said openings and a second dump door for closing the other of said openings, of spring means for returning said doors to closed position after the dumping of the load, releasable locking mechanism for holding both of said doors closed or for holding one of said doors open, and means precluding opening movement of one of said doors prior to opening movement of the other of said doors.

30. In a load carrying container having two dumping openings therein, the combination with a first dump door for closing one of said openings and a second dump door for closing the other of said openings, of spring means for returning said doors to closed position after the dumping of the load, two rotatable members each operatively connected with one of said doors, each of said rotatable members rotating in one direction when its respective door is opening and rotating in the opposite direction when its respective door is closing, releasable locking mechanism for holding both of said doors closed, and a lost motion clutch operatively connected with said two rotatable members for precluding opening movement of one of said doors prior to opening movement of the other of said doors.

31. In a load carrying container having two dumping openings therein, the combination with a first dump door for closing one of said openings and a second dump door for closing the other of said openings, two rotatable members each operatively connected with one of said doors, each of said rotatable members rotating in one direction when its respective door is opening and rotating in the opposite direction when its respective door is closing, spring means for returning said doors to closed position after the dumping of the load, releasable locking mechanism for holding both of said doors closed, and a lost motion clutch operatively connected with said two rotatable members for precluding opening movement of one of said doors prior to opening movement of the other of said doors.

32. In a load carrying container having two dumping openings therein, the combination with a first dump door for closing one of said openings and a second dump door for closing the other of said openings, two rotatable shafts, flexible members operatively connected with said doors and adapted to wind upon and unwind from said shafts when said doors are closing and opening, spring means operatively connected with said shafts to return said doors to closed position after the dumping of the load, releasable locking mechanism cooperating with said shafts for holding both of said doors closed, and a lost motion clutch operatively connected with both of said shafts for precluding opening movement of one of said doors prior to opening movement of the other of said doors.

33. In a load carrying container having two dumping openings therein, the combination with a first dump door adapted to occupy closed and open positions with respect to one of said openings and a second dump door adapted to occupy closed and open positions with respect to the other of said openings, releasable locking mechanism for holding both of said doors in their closed positions, said locking mechanism being releasable to permit one of said doors to move to its open position independently of the other, a single spring, and mechanism operatively connecting said single spring with both of said doors for returning said doors to their closed positions.

34. In a load carrying container having two dumping openings therein, the combination with a first dump door for occupying closed and open positions with respect to one of said openings and a second dump door adapted to occupy closed and open positions with respect to the other of said openings, a single spring, apparatus operatively connecting one end of said spring with one of said doors and apparatus operatively connecting the other end of said spring with the other of said doors for returning said doors to their closed positions, releasable locking mechanism cooperating with said apparatus for holding both of said doors in their closed positions and for holding one of said doors in its open position, and means for precluding movement of one of said doors to its open position prior to such movement of the other of said doors.

35. In a load carrying vehicle, the combination with a bed having a discharge opening therein, a dumping door movable between open and closed positions with respect to said opening, a winding shaft mounted on one end of said bed, flexible means operatively connected with said door and adapted to wind upon and unwind from said shaft in the movements of said door, a second shaft mounted upon the end of said bed and spaced from said winding shaft, a coiled spring having one end connected to said second shaft, motion transmitting mechanism operatively connecting said shafts and causing one of said shafts to rotate at a different rate than the other, and releasable locking mechanism coacting with one of said shafts for holding said door in closed position.

JAMES D. BENBOW.
DE MAR A. PALMER.

CERTIFICATE OF CORRECTION

Patent No. 2,005,727.                        June 25, 1935.

JAMES D. BENBOW, ET AL.

It is hereby certified that error appears in the printed specification of the above numbered patent requiring correction as follows. Page 11, second column, line 56, claim 4, for "torsienel" read torsional; and page 14, first column, line 52, claim 25, for "the irrespective" read their respective; and that the said Letters Patent should be read with these corrections therein that the same may conform to the record of the case in the Patent Office.

Signed and sealed this 13th day of August, A. D. 1935.

Leslie Frazer (Seal)                           Acting Commissioner of Patents.